US009150202B2

(12) United States Patent
Kirby

(10) Patent No.: US 9,150,202 B2
(45) Date of Patent: Oct. 6, 2015

(54) ELECTRIC MOTOR

(75) Inventor: Rupert Paul Kirby, Hants (GB)

(73) Assignee: PROTEAN ELECTRIC LIMITED (GB)

( * ) Notice: Subject to any disclaimer, the term of this patent is extended or adjusted under 35 U.S.C. 154(b) by 158 days.

(21) Appl. No.: 13/696,154

(22) PCT Filed: May 5, 2011

(86) PCT No.: PCT/IB2011/051998
§ 371 (c)(1),
(2), (4) Date: Apr. 5, 2013

(87) PCT Pub. No.: WO2011/138756
PCT Pub. Date: Nov. 10, 2011

(65) Prior Publication Data
US 2013/0218436 A1    Aug. 22, 2013

(30) Foreign Application Priority Data
May 7, 2010   (GB) .................................. 1007671.9

(51) Int. Cl.
*B60T 7/12*       (2006.01)
*B62D 61/06*      (2006.01)
(Continued)

(52) U.S. Cl.
CPC ............. *B60T 8/1761* (2013.01); *B60K 7/0007* (2013.01); *B60K 17/356* (2013.01); *B60L 3/108* (2013.01);
(Continued)

(58) Field of Classification Search
CPC ..... B60C 23/061; B60T 8/1761; B60T 13/58; B60T 13/66; B60T 8/00; B60T 8/3665; B60T 8/4081; B60T 8/4827; B60T 8/489; B60L 3/108; H02K 7/006; H02P 6/16; F16D 2121/20; F16D 57/002; F16D 65/14; Y10S 303/03

USPC ............. 701/74; 318/803, 805, 811, 599, 799
See application file for complete search history.

(56) References Cited

U.S. PATENT DOCUMENTS

| 4,544,868 A | 10/1985 | Murty |
| 2006/0241892 A1* | 10/2006 | Gustavsson .................. 702/148 |

(Continued)

FOREIGN PATENT DOCUMENTS

| EP | 0786369 A | 7/1997 |
| EP | 1502805 A | 2/2005 |

(Continued)

OTHER PUBLICATIONS

European Patent Office, PCT International Search Report, Sep. 20, 2012, pp. 1-4, WIPO.

(Continued)

*Primary Examiner* — Muhammad Shafi
(74) *Attorney, Agent, or Firm* — The Mason Group Patent Specialists LLC; Valerie M. Davis

(57) ABSTRACT

An electric motor for rotating a wheel of a vehicle, the electric motor having a rotor, a stator and coil windings, a first sensor arranged to output a first signal indicative of a position of the rotor relative to the stator, a second sensor arranged to output a second signal indicative of a position of the rotor relative to the stator; wherein the first sensor and second sensor are offset with respect to each other such that upon rotation of the rotor relative to the stator the first output signal and second output signal allow the direction of the rotor to be determined; wherein the first output signal and second output signal are used for controlling current in the coil windings and at least one of the first output signal and second output signal are provided to a vehicle braking system to allow the vehicle braking system to determine a wheel lock condition or an onset of a wheel lock condition, wherein the onset of a wheel lock condition is determined based on predetermined criteria.

13 Claims, 4 Drawing Sheets

(51) Int. Cl.
*H02K 7/14* (2006.01)
*B60T 8/1761* (2006.01)
*B60K 7/00* (2006.01)
*B60K 17/356* (2006.01)
*B60L 3/10* (2006.01)
*B60L 11/18* (2006.01)
*B60R 16/02* (2006.01)
*H02K 7/00* (2006.01)
*H02P 6/16* (2006.01)

(52) U.S. Cl.
CPC ............. *B60L 11/1807* (2013.01); *B60R 16/02* (2013.01); *H02K 7/006* (2013.01); *H02P 6/16* (2013.01); *B60K 2007/0038* (2013.01); *B60K 2007/0092* (2013.01); *B60L 2220/44* (2013.01); *B60L 2260/28* (2013.01); *Y02T 10/7005* (2013.01); *Y02T 10/7258* (2013.01)

(56) References Cited

U.S. PATENT DOCUMENTS

2009/0251089 A1* 10/2009 O'Gorman et al. ...... 318/400.33
2010/0256887 A1* 10/2010 Linda et al. .................... 701/82

FOREIGN PATENT DOCUMENTS

| | | | |
|---|---|---|---|
| GB | 2440251 A | | 1/2008 |
| WO | WO-2007-030073 | * | 3/2007 |
| WO | 2009060090 A | | 5/2009 |
| WO | WO-2009-060090 | * | 5/2009 |

OTHER PUBLICATIONS

Intellectual Property Office, Search Report under Section 17, Jun. 21, 2010, p. 1, Intellectual Property Office, GB.

* cited by examiner

ELECTRIC MOTOR

The present invention relates to an electric motor, and in particular an electric motor for rotating a wheel on a vehicle.

Anti-lock braking systems (ABS) are typically electro-mechanical control systems designed to monitor and influence wheel dynamics during braking manoeuvres. A typical ABS system will include 3 to 4 wheel speed sensors, an electronic control unit containing algorithms for processing wheel speed information, a series of solenoid driven valves, and a pump motor sub-system that can be actuated to interrupt and release brake fluid pressure from brake components.

ABS systems operate by analysing wheel speed information. If during a braking manoeuvre an ABS system determines that wheel speed is slowing at a rate greater than would be expected for a vehicle, the ABS system assumes that the wheel is beginning to slip (i.e. the onset of a wheel lock is occurring) and the ABS system releases brake pressure.

As such, it is essential for an ABS system to have accurate wheel speed information. Similarly, Electronic Stability Program (ESP) systems also need accurate wheel speed information.

In accordance with an aspect of the present invention there is provided an electric motor according to the accompanying claims.

The invention as claimed provides the advantage of allowing electric motor rotor position information to be used as a speed input signal to an ABS system, thereby avoiding the need for separate ABS speed sensors and consequently allowing ABS system costs to be reduced.

The present invention will now be described, by way of example, with reference to the accompanying drawings, in which.

Figure 1:
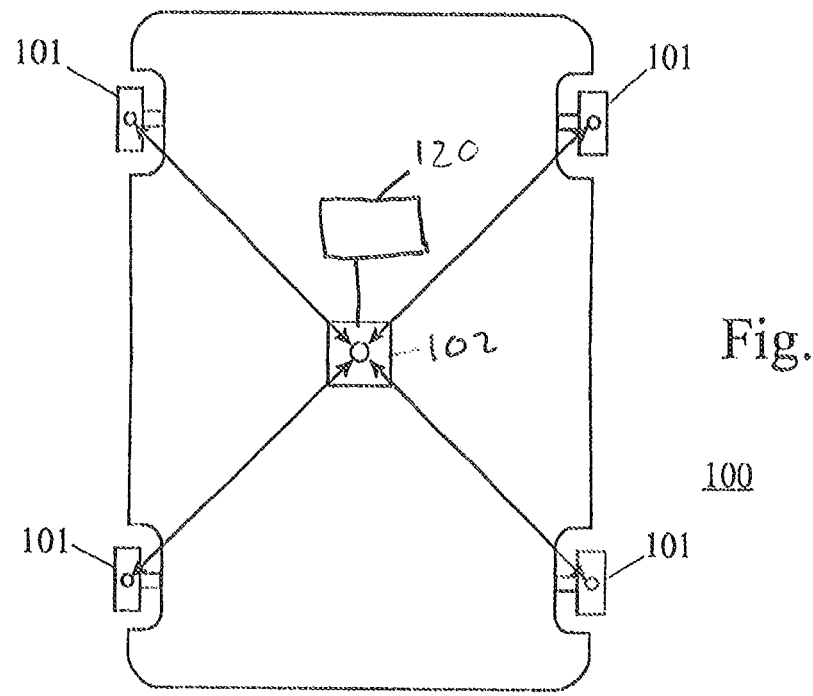
FIG. 1 illustrates a vehicle according to an embodiment of the present invention.

FIG. 1 illustrates a vehicle 100, for example a car or lorry, having four wheels 101, where two wheels are located in the vehicles forward position in a near side and off side position respectively. Similarly, two additional wheels are located in the vehicles aft position in near side and off side positions respectively, as is typical for a conventional car configuration. However, as would be appreciated by a person skilled in the art, the vehicle may have any number of wheels.

Incorporated within each wheel 101 is an in-wheel electric motor, as described in detail below. Although the current embodiment describes a vehicle having an in-wheel electric motor associated with each wheel 101, as would be appreciated by a person skilled in the art only a subset of the wheels 101 may have an associated in-wheel electric motor. For example, for a four wheeled vehicle only the front two wheels may have associated in-wheel motors or alternately only the rear two wheels may have associated in-wheel motors.

Coupled to each in-wheel electric motor is a master controller 102, otherwise known as a vehicle dynamic controller, for controlling the operation of the in-wheel electric motors.

Additionally, the vehicle includes a battery 120 for providing a power source for the in-wheel electric motors.

Incorporated in the vehicle is a brake system in which a brake, for example a disc or drum brake, is associated with at least one of the wheels to allow a brake force to be applied to the wheel. For the purposes of the present embodiment a brake assembly is mounted on each of the in-wheel electric motors to allow a braking force to be imparted to each of the four wheels.

The application of a brake torque on each of the four wheels from a respective brake assembly is initiated via a brake pedal located within the vehicle.

To allow optimum braking under a variety of different driving situations and road conditions the brake system includes an antilock braking system.

As is well known to a person skilled in the art, antilock brake systems are arranged to reduce brake force being applied to a wheel if the antilock brake system makes a determination that a wheel lock condition or the onset of a wheel lock condition has occurred.

The antilock braking system within the vehicle includes an electronic control module for controlling the operation of the antilock braking system and means for adjusting braking force during a wheel lock condition or an onset of a wheel lock condition. For the purpose of the present embodiment, where the vehicle includes a hydraulic braking system, the means for adjusting braking force is a hydraulic control unit that is arranged to control hydraulic pressure to the brake system.

To make a determination as to whether a wheel lock condition or the onset of a wheel lock condition is occurring during a braking manoeuvre, the antilock brake systems electronic control module analyses wheel speed information at predetermined time intervals. If the wheel speed information indicates that the wheel is decelerating at greater than a predetermined rate (e.g. at a rate greater than would normally be achievable for a vehicle) this is considered as being indicative of a wheel lock condition or the onset of a wheel lock condition and the antilock brake system reduces the brake force being applied to the wheel, for example by reducing hydraulic brake pressure, thereby allowing the wheel to reaccelerate back up to the vehicle's actual speed.

The onset of a wheel lock condition may be determined based on a number of predetermined criteria, for example upon a determination that a wheel is decelerating above a threshold value.

For the purpose of illustration, the in-wheel electric motor is of the type having a set of coils being part of the stator for attachment to the vehicle, radially surrounded by a rotor carrying a set of magnets for attachment to a wheel. However, as would be appreciated by a person skilled in the art, the present invention is applicable to other types of electric motors.

Figure 2:
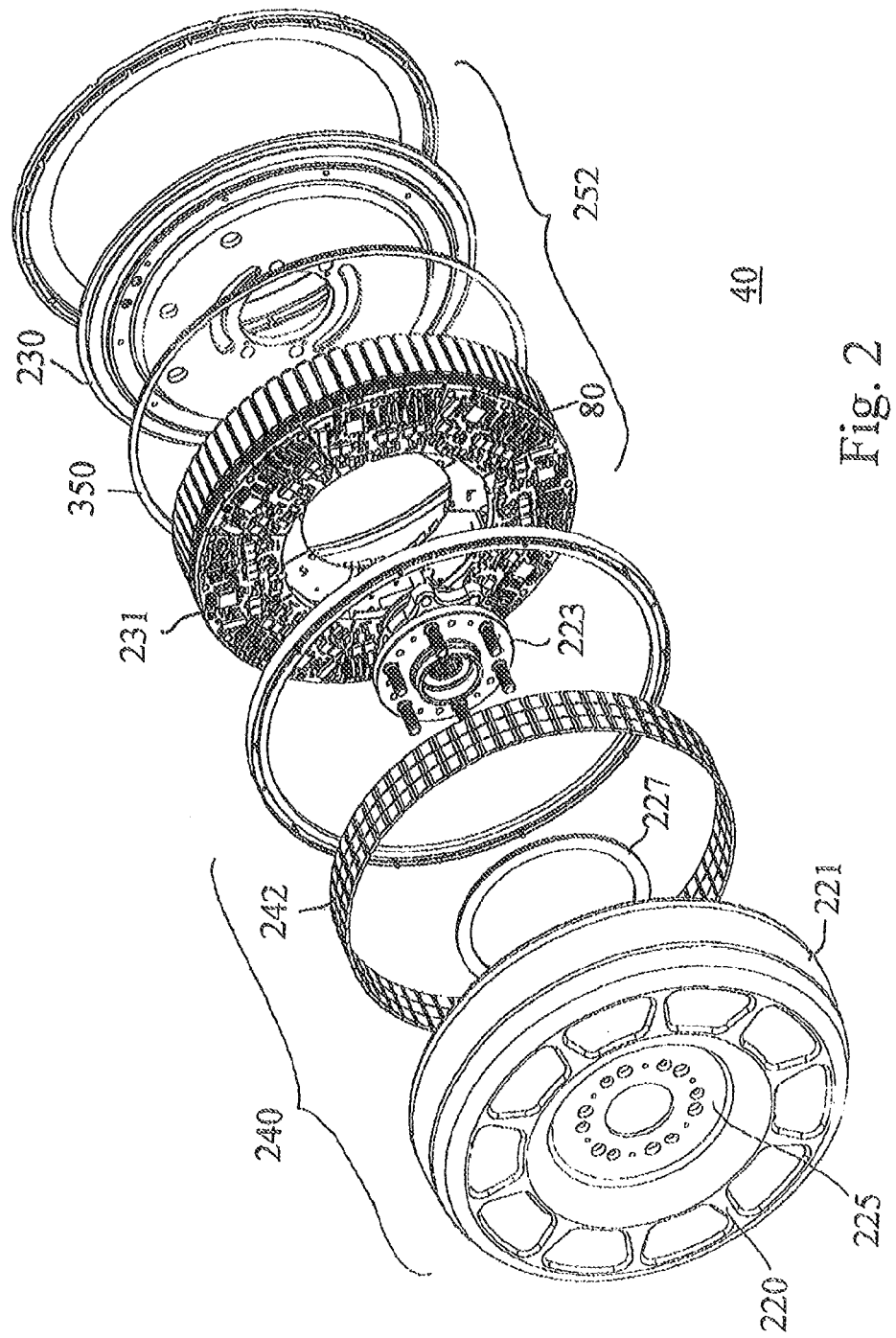
FIG. 2 illustrates an exploded view of an electric motor as used in an embodiment of the present invention.

As illustrated in FIG. 2, the in-wheel electric motor 40 includes a stator 252 comprising a rear portion 230 forming a first part of the housing of the assembly, and a heat sink and drive arrangement 231 comprising multiple coils and electronics to drive the coils. The coil drive arrangement 231 is fixed to the rear portion 230 to form the stator 252 which may then be fixed to a vehicle and does not rotate during use. The coils themselves are formed on tooth laminations which together with the drive arrangement 231 and rear portion 230 form the stator 252.

A rotor 240 comprises a front portion 220 and a cylindrical portion 221 forming a cover, which substantially surrounds the stator 252. The rotor includes a plurality of magnets 242 arranged around the inside of the cylindrical portion 221. The magnets are thus in close proximity to the coils on the assembly 231 so that magnetic fields generated by the coils in the assembly 231 cooperate with the magnets 242 arranged around the inside of the cylindrical portion 221 of the rotor 240 to cause the rotor 240 to rotate.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 233 of the wall 230 of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

Figure 3:
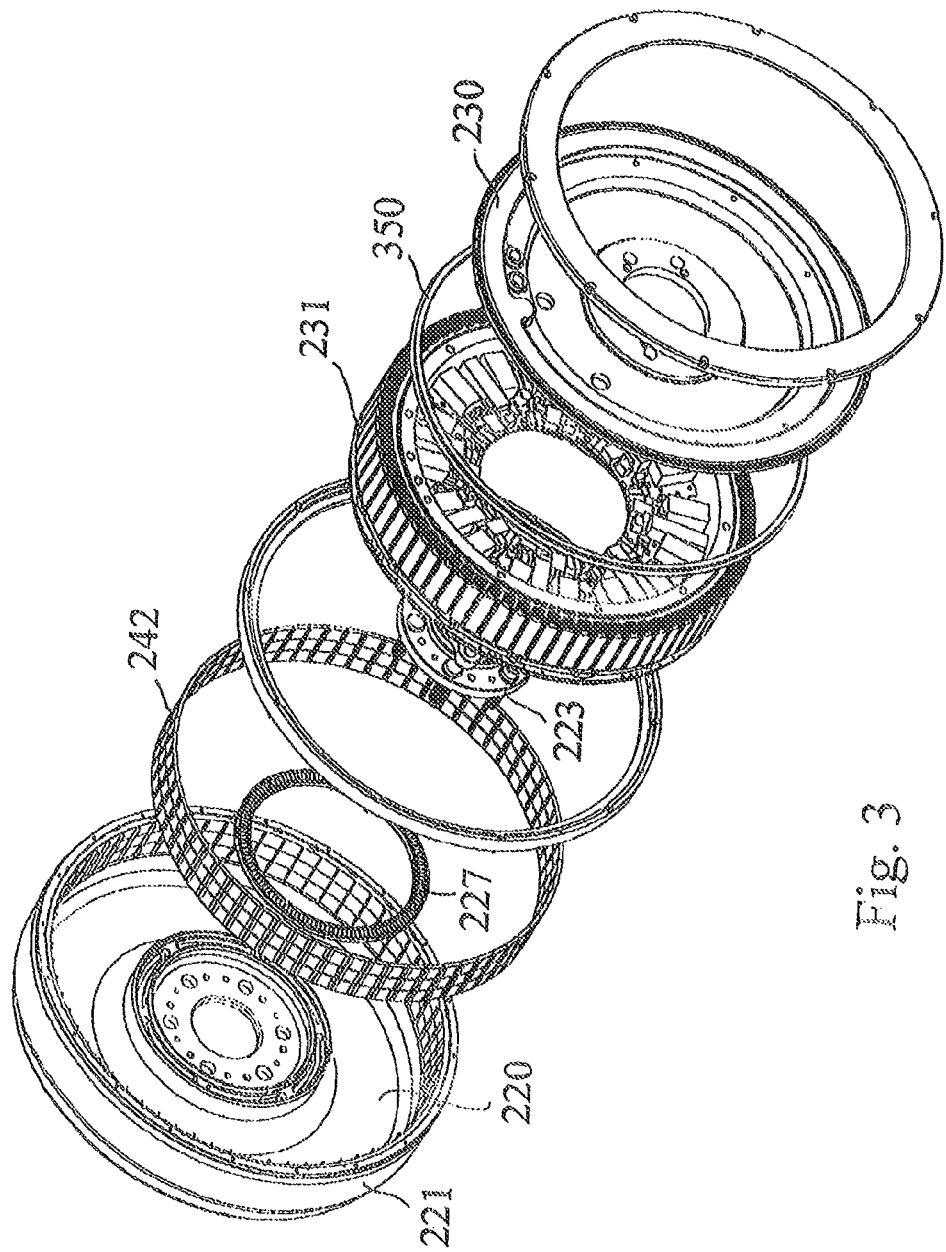
FIG. 3 illustrates an exploded view of the electric motor shown in FIG. 2 from an alternative angle.

FIG. 3 shows an exploded view of the same assembly as FIG. 2 from the opposite side showing the stator 252 comprising the rear stator wall 230 and coil and electronics assembly 231. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

Additionally shown in FIG. 2 are circuit boards 80 carrying control electronics, otherwise known as motor drive controllers or inverters.

A V shaped seal 350 is provided between the circumferential wall 221 of the rotor and the outer edge of the stator housing 230.

The rotor also includes a focussing ring and magnets 227 for rotor position sensing, which in conjunction with sensors mounted on the stator allows for an accurate position determination of the rotor relative to the stator to be made, as described in detail below.

The motor 40 in this example includes 8 coil sets 60 with each coil set 60 having three coil sub-sets 61, 62, 63 that are coupled to a respective control device 64, where each control device 64 and respective coil sub-sets form a three phase logical or sub electric motor that can be controlled independently of the other sub motors. The control devices drive their respective sub motor with a three phase voltage supply, thereby allowing the respective coil sub-sets to generate a rotating magnetic field. Although the present embodiment describes each coil set 60 as having three coil sub-sets 61, 62, 63, the present invention is not limited by this and it would be appreciated that each coil set 60 could have two or more coil sub-sets. Equally, although the present embodiment describes an electric motor having eight coil sets 60 (i.e. eight sub motors) the motor could have two or more coil sets with associated control devices (i.e. two or more sub motors).

Each control device includes a three phase bridge inverter which, as is well known to a person skilled in the art, contains six switches. The three phase bridge inverter is coupled to the three subset coils of a coil set 60 to form a three phase electric motor configuration. Accordingly, as stated above, the motor includes eight three phase sub-motors, where each three phase sub-motor includes a control device 64 coupled to the three sub-set coils of a coil set 60.

Each three phase bridge inverter is arranged to provide PWM voltage control across the respective coil sub-sets 61, 62, to provide a required torque for the respective sub-motors.

For a given coil set the three phase bridge switches of a control device 64 are arranged to apply a single voltage phase across each of the coil sub-sets 61, 62, 63.

Although the in-wheel electric motor described in the present embodiment includes a plurality of logical sub-motors, as person skilled in the art would appreciate the electric motor may be of a conventional design without the use of logical sub-motors.

In this embodiment, each control device 80 is substantially wedge-shaped. This shape allows multiple control devices 80 to be located adjacent each other within the motor, forming a fan-like arrangement.

Figure 5:
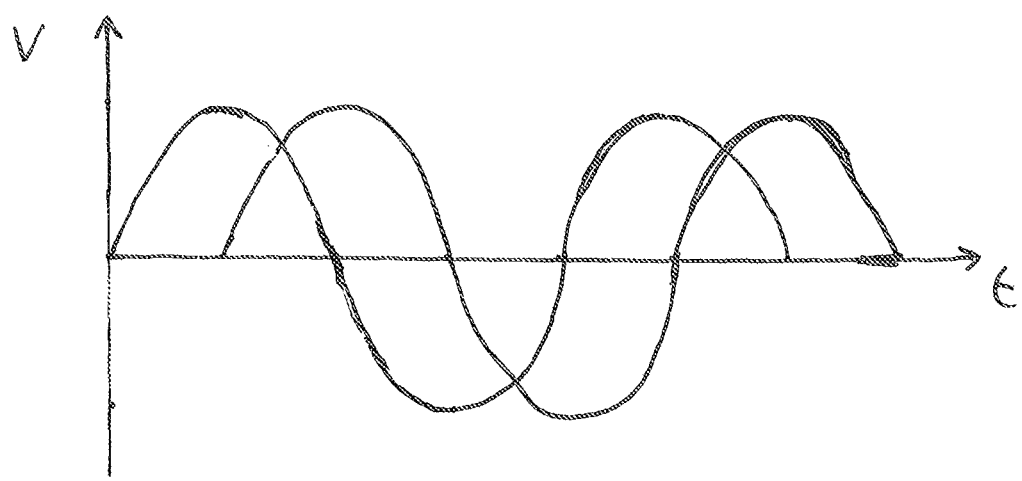
FIG. 5 illustrates the output from two electric motor position sensors.

The control device 80 switches can include semiconductor devices such as MOSFETs or IGBTs. In the present example, the switches comprise IGBTs. However, any suitable known switching circuit can be employed for controlling the current. One well known example of such a switching circuit is the H-bridge circuit having six switches configured to drive a three phase electric motor. The six switches are configured as three parallel sets of two switches, where each pair of switches is placed in series and from a leg of the H-bridge circuit. FIG. 5 illustrates an example of an H-bridge circuit 400 coupled to three coil subsets.

Figure 4:
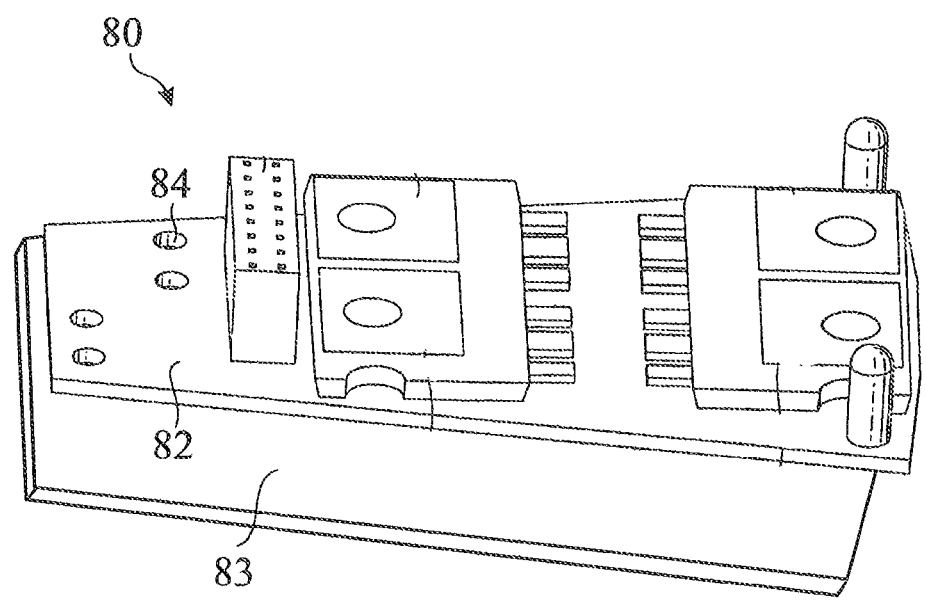
FIG. 4 illustrates a control device in accordance with an embodiment of the present invention.

FIG. 4 shows an example of a control device 80 in accordance with an embodiment of this invention.

The control device 80 includes a first circuit board 83 and a second circuit board 82. Preferably the second board 82 is arranged to overlay the first circuit board 83.

The first circuit board 83 includes the plurality of switches that are arranged to apply an alternating voltage across the respective coil sub-sets.

As described above, the plurality of switches are configured to form an n-phase bridge circuit. Accordingly, as is well known to a person skilled in the art, the number of switches will depend upon the number of voltage phases to be applied to the respective sub motors. In the present embodiment, in which the control devices and coil sub-sets are configured to form a three phase motor, the first circuit board 83 of the respective control devices include six switches. Although the current design shows each sub motor having a three phase construction, the sub motors can be constructed to have two or more phases.

The wires (e.g. copper wires) of the coil sub-sets can be connected directly to the switching devices as appropriate.

To aid heat dissipation, the first circuit board 83 is preferably manufactured from a material having a relatively high thermal conductance, for example metal, that aids the removal of heat away from the switches. As material having a high thermal conductance typically also have a high electrical conductance it is preferable for materials having a relatively high electrical conductance to have an insulating layer applied to portions of the first circuit board 83 to minimize the risk of short circuits occurring.

The second circuit board 82 includes a number of electrical components for controlling the operation of the switches mounted on the first circuit board 83. Examples of electrical components mounted on the second circuit board 82 include control logic for controlling the operation of the switches for providing PWM voltage control and interface components, such as a CAN interface chip, for allowing the control device 80 to communicate with devices external to the control device 80, such as other control devices 80 or a master controller.

Typically the second control board 82 will communicate over the interface to receive torque demand requests and to transmit status information.

As mentioned above, the second circuit board 82 is arranged to be mounted on top of the first circuit board 83, where the first circuit board 83 and the second circuit board include means for being mounted within the motor 40, for example, adjacent to the coil sub-set which they control, directly to a cooling plate. In the illustrated example, these means include apertures 84 through which screws or suchlike can pass. In this example, the first circuit board 83 and the second circuit board 82 are substantially wedge-shaped. This shape allows multiple control devices 80 to be located adjacent each other within the motor, forming a fan-like arrangement. By separating the control logic from the switches this has the advantage of thermally isolating the control logic from the switches while also minimizing the impact of any electrical noise generated by the switches.

To control current in the respective coils, the timing of the control devices 80 switches is determined using a vector control system, where vector control is used to recreate DC electric motor orthogonal components in an AC motor to allow the torque producing current to be determined independently of the magnetic flux producing current.

As is well known to a person skilled in the art, the transformation of 3 phase stator currents into a two phase orthogonal vector is performed using a Clarke transform. A further transformation is then required to relate the components of a stationary stator frame into the rotating reference frame of a rotor using a Park transform.

To perform the Park transform, accurate angular position of the rotor is required, which is performed using an active position sensor mounted on each of the circuit boards. For the purposes of the present invention, a Hall sensor is used as a position sensor, where the hall sensor is arranged to generate an electrical signal dependent upon the relative position of the focusing ring and magnets 227, which is mounted on the rotor 240. To determine the direction that the rotor is turning in, the control device 80 preferably have two position sensors that are offset by a predetermined angle, for example 90 degrees, so that the changes in signal from each of the position sensors can be analyzed to determine both the relative position of the rotor 240 and the direction of rotation of the rotor is. As is well known to a person skilled in the art, the angle position information is based on phase angle of the current in coil windings of a sub motor. To allow each control device 80, and hence each sub motor, to operate independently of each other each control device 80 has their own set of position sensors. However, a single set of position sensors could be used per in-wheel electric motor. By having a set of position sensors mounted on a number of the control devices this has the advantage of providing redundancy should a fault occur with one set of position sensors.

Although the present embodiment incorporates an active sensor, other forms of position sensor could be used, for example inductive position sensors that include a magnet and coil mounted adjacent to a toothed ring.

As the rotor rotates relative to the stator, the position sensors output an AC voltage signal that allows the position of the rotor to be determined. The output AC voltage position signals have a frequency proportional to the speed of the rotor. By way of illustration, FIG. 5 represents the output from two position sensors mounted on a control device 80 that have been separated by approximately 90 degrees. That is to say, two sinusoidal signals are output, where one output signal is shifted by approximately 90 degrees with respect to the other output signal.

As stated above, the position information is used by the control devices to control the inverter switches to allow a required current to flow in the respective coils.

To generate a speed signal for input into the ABS electronic control module, the output signals from two position sensors mounted on a control device are rectified to generate respective alternating square waves that are shifted by approximately 90 degrees with respect to each other. The two square waveforms are passed through an exclusive OR gate to generate a series of pulses, where the series of pulses are proportional to the speed of the rotor relative to the stator and consequently proportional to the wheel speed.

The series of pulses are input into the ABS electronic control module. Typically, the series of pulses generated by the position sensors, and which form the ABS input signal, is a pulse train derived from detecting the zero crossing points of at least one of the position sensor signals. The ABS electronic control module uses the series of pulses to determine wheel speed and consequently whether a wheel lock condition or onset of a wheel lock condition is occurring.

If there is a mismatch between the frequency of the pulse train generated by the position sensors and that expected by the ABS electronic control module preferably the pulse train is re-sampled to generate a required pulse train frequency. Alternatively, the ABS electronic control module can be recalibrated.

Although the present embodiment describes the use of two position sensors to generate a speed input signal for the ABS system, a speed input signal for the ABS system can be generated from the output of a single position sensor.

Using the output signals from position sensors in each of the in wheel electric motor it is possible to provide the ABS system with speed information for each vehicle wheel.

Although the above embodiment is based on determining wheel speed information for an ABS system, it would be appreciated by a person skilled in the art that the determined wheel speed information can be used in an ESP system, where the wheel information can be used to determine whether a wheel is accelerating faster than the vehicle to which the wheel is attached (i.e. a wheel spin condition is occurring). In such a scenario the braking system can be arranged to apply a braking force to the spinning wheel to stop the wheel spin condition.

The invention claimed is:

1. An electric motor for rotating a wheel of a vehicle, the electric motor having a rotor, a stator and coil windings, a first sensor arranged to output a first signal indicative of a position of the rotor relative to the stator, wherein the first output signal is arranged to be provided to at least one control device for controlling current in the coil windings and the first output signal is also arranged to be provided to a vehicle braking system to allow the vehicle braking system to determine a wheel lock condition or an onset of a wheel lock condition, wherein the onset of a wheel lock condition is determined based on predetermined criteria.

2. An electric motor according to claim 1, further comprising a second sensor arranged to output a second signal indicative of a position of the rotor relative to the stator; wherein the first sensor and second sensor are offset with respect to each other such that upon rotation of the rotor relative to the stator the first output signal and second output signal allow the direction of the rotor to be determined.

3. An electric motor according to claim 2, wherein the first output signal and second output signal are used for controlling current in the coil windings.

4. An electric motor according to claim 2, wherein the second output signal is arranged to be provided to the vehicle braking system to allow the vehicle braking system to determine a wheel lock condition or an onset of a wheel lock condition, wherein the onset of a wheel lock condition is determined based on predetermined criteria.

5. An electric motor according to claim 2, wherein the first sensor and second sensor are offset by substantially 90 degrees with respect to the phase angle of a current in a coil winding.

6. An electric motor according to claim 2, wherein the first and second sensor is a position sensor.

7. An electric motor according to claim 6, wherein the first sensor and/or second sensor is a passive inductive position sensor or an active position sensor.

8. An electric motor according to claim 7, further comprising a plurality of magnets, wherein the plurality of magnets are positioned to allow the active position sensor to determine the location of the rotor relative to the stator.

9. An electric motor according to claim 1, wherein the predetermined criteria includes determining that the deceleration of the wheel is above a threshold deceleration value.

10. An electric motor according to claim 1, further comprising means for generating a rotor speed from changes in position data from the position sensors as the rotor moves relative to the stator.

11. An electric motor according to claim 1, wherein the first output signal is converted into an ABS signal by detecting the zero crossing points of the first output signal.

12. An electric motor according to claim 11, wherein the ABS signal is re-sampled.

13. A vehicle having a plurality of in-wheel electric motors according to claim 1, with a wheel mounted to a respective in-wheel electric motor.

* * * * *